United States Patent
Rathi (10) Patent No.: US 9,207,997 B2
(45) Date of Patent: Dec. 8, 2015

(54) MULTITHREADED LOCK MANAGEMENT

(75) Inventor: Pradeep Kumar Rathi, Bangalore (IN)

(73) Assignee: Novell, Inc., Provo, UT (US)

( * ) Notice: Subject to any disclaimer, the term of this patent is extended or adjusted under 35 U.S.C. 154(b) by 2533 days.

(21) Appl. No.: 11/930,603

(22) Filed: Oct. 31, 2007

(65) Prior Publication Data
US 2009/0044194 A1    Feb. 12, 2009

(30) Foreign Application Priority Data
Aug. 9, 2007   (IN) .......................... 1695/DEL/2007

(51) Int. Cl.
*G06F 9/46*    (2006.01)
*G06F 9/52*    (2006.01)

(52) U.S. Cl.
CPC ............... *G06F 9/526* (2013.01); *G06F 9/522* (2013.01)

(58) Field of Classification Search
USPC .......... 718/100, 102, 104, 101, 108; 710/200, 710/220
See application file for complete search history.

(56) References Cited

U.S. PATENT DOCUMENTS

| | | | |
|---|---|---|---|
| 6,029,190 A | 2/2000 | Oliver | |
| 6,823,511 B1* | 11/2004 | McKenney et al. | 718/102 |
| 7,188,344 B1* | 3/2007 | Blue | 718/106 |
| 7,512,950 B1* | 3/2009 | Marejka | 718/106 |
| 2002/0138706 A1* | 9/2002 | Hugly | 711/163 |
| 2003/0005195 A1 | 1/2003 | Davis et al. | |
| 2003/0140177 A1 | 7/2003 | Arajs et al. | |
| 2005/0114609 A1* | 5/2005 | Shorb | 711/152 |
| 2005/0289549 A1* | 12/2005 | Cierniak et al. | 718/102 |
| 2006/0168585 A1 | 7/2006 | Grcevski et al. | |
| 2006/0242644 A1 | 10/2006 | Blue | |
| 2008/0320262 A1* | 12/2008 | McKenney et al. | 711/163 |

OTHER PUBLICATIONS

"Cross-Referencing Linux: Linux/include/linux/seqlock.h", http://lxr.linux.no/source/include/linux/seqlock.h, (No date listed).
"Dekker's algorithm", http://en.wikipedia.org/wiki/Dekker%27s_algorithm, From Wikipedia,(Dec. 20, 2006).
"Lamport's bakery algorithm", http://en.wikipedia.org/wiki/Lamport%27s_bakery_algorithm, From Wikipedia,(Mar. 8, 2007).
"Patch from Stephen Hemminger", http://kernel.org/pub/linux/kernel/people/akpm/patches/2.5/2.5.65/2.5.65-mm1/broken-out/brlock-removal-5.patch, (2000).

(Continued)

*Primary Examiner* — Emerson Puente
*Assistant Examiner* — Willy W Huaracha
(74) *Attorney, Agent, or Firm* — Schwegman Lundberg & Woessner, P.A.

(57) ABSTRACT

Apparatus, systems, and methods may operate to construct a memory barrier to protect a thread-specific use counter by serializing parallel instruction execution. If a reader thread is new and a writer thread is not waiting to access data to be read by the reader thread, the thread-specific use counter is created and associated with a read data structure and a write data structure. The thread-specific use counter may be incremented if a writer thread is not waiting. If the writer thread is waiting to access the data after the thread-specific use counter is created, then the thread-specific use counter is decremented without accessing the data by the reader thread. Otherwise, the data is accessed by the reader thread and then the thread-specific use counter is decremented. Additional apparatus, systems, and methods are disclosed.

25 Claims, 3 Drawing Sheets

(56) References Cited

OTHER PUBLICATIONS

"Peterson's algorithm", http://en.wikipedia.org/wiki/Peterson's_algorithm, From Wikipedia,(Mar. 12, 2007).

Russell, Paul R., "Big Reader Locks", http://people.netfilter.org/~rusty/unreliable-guides/kernel-lockinq/kernel-locking.docbook/brlock.html, Unreliable Guide to Locking: Chapter 4. Common Techniques,(2000).

* cited by examiner

FIG. 3

MULTITHREADED LOCK MANAGEMENT

RELATED APPLICATIONS

The present application claims priority to India Patent Application No. 1695/DEL/2007 filed in the India Patent Office on Aug. 9, 2007 and entitled "MULTITHREADED LOCK MANAGEMENT;" the disclosure of which is incorporated by reference herein.

FIELD

The embodiments disclosed herein relate generally to data processing, including managing access to data in a multi-threaded processing environment.

BACKGROUND

Read-Write locks are used in multithreaded applications to protect shared data that is mostly accessed in read mode. Read-Write locks are used instead of mutexes so that multiple read mode threads don't block until a lock is acquired in write mode. However, read-write lock implementation by conventional operating systems often makes use of an internal mutex, put in place during some part of the time when a read mode read-write lock is acquired. The internal mutex is released as soon as the read mode lock acquisition is complete. However, for those applications that operate to acquire and release read-write locks in read mode on a frequent basis, this use of an internal mutex can significantly degrade processing performance. The reduction in performance may be quite noticeable when using multiple central processing unit (multi-cpu) hardware. Thus, there is a need for apparatus, systems, and methods to improve processing performance when read-write locks are used.

SUMMARY

In various embodiments, apparatus, systems, and methods for multithreaded lock management are provided. For example, in some embodiments, multithreaded lock management includes constructing a memory barrier to protect a thread-specific usage counter by serializing parallel instruction execution for one or more processors. If a reader thread is new and a writer thread is not waiting to access data to be read by the reader thread, the thread-specific usage counter can be created and associated with a reader data structure and a writer data structure. The thread-specific use counter may be incremented by a reader thread if a writer thread is not waiting. If the writer thread is found to be waiting to access the data after the thread-specific use counter is incremented by reader thread, then the thread-specific use counter is decremented by the same reader thread and the reader thread is blocked till the writer thread releases the read-write lock. Otherwise, the reader thread read-mode lock acquisition is completed and the use count is decremented when the reader thread releases the lock.

Some embodiments include indicating that a writer thread is waiting to access data, and then determining the number of active reader threads by accessing thread-specific data forming a portion of a thread-specific data structure protected by a memory barrier. All writer threads are serialized using a writer mutex. The thread-specific data structure is linked to a write data structure and a read data structure. If the number of active reader threads is not greater than zero, the writer thread will proceed with lock acquisition in write mode and set an internal variable to writer running mode. Other embodiments are also disclosed, and along with the foregoing examples, will be described in detail below.

DETAILED DESCRIPTION

Some of the challenges described above may be addressed by using thread-specific read mode counters which are incremented/decremented solely by their corresponding reader threads that operate to acquire/release read-write locks in read mode. Writer threads check to determine if any of the thread-specific mode counters associated with common data have been incremented, and refrain from acquiring a read-write lock in write mode if that is the case. Memory barriers are used to ensure read/write consistency by protecting access to the thread-specific use counters, which may in turn form part of thread-specific data structures held in common read and write tables Processor cache coherence protocol ensures that data structure content is synchronized between processor caches.

As used herein, a "memory barrier" is a barrier that, when constructed, enforces an ordering constraint on memory operations beyond a selected point in a series of processor program execution instructions. In short, it results in serializing instruction execution for processors executing instructions out of order for optimization. This is the case for a single processor that can execute multiple instructions in parallel, or multiple processors executing single instructions in parallel with each other, and combinations of these.

The memory fence or "MFENCE" instruction is an Intel®-specific example of an instruction that can be used to construct this type of memory barrier. The MFENCE instruction performs a serializing operation on all load and store instructions that were issued prior to the instruction, so that every load and store instruction that precedes the MFENCE instruction in program order is globally visible before any load or store instruction that follows the MFENCE instruction is globally visible.

A "reader thread" is a thread that attempts to read data, and thus, may share access to the data with other reader threads. Many threads may acquire a read-write lock for read access.

A "writer thread" is a thread that attempts to write data, and thus, requires exclusive access to the data for some period of time. Only one thread at a time may acquire a read-write lock for write access.

In most embodiments, implementing read-write locks as a part of multithreaded processing involves the use of unique thread identifiers that can be accessed by individual threads (e.g., using commands such as pthread_self( )), and atomic byte write operations are assumed. A thread processing command library can provide an interface to access and store thread-specific data (e.g., a thread-specific use counter) based on a key. While creating a thread-specific key, applications can specify a function to be called (e.g., a callback function) when the thread is destroyed. Upon destruction, the associated callback function can be called using the value associated with the key of the thread that has been destroyed.

In most embodiments, a thread specific data structure to store thread-specific use counters and pointers to link this data structure into internal tables is maintained. The following internal tables may be used to assist in this endeavor:

Read Data Structure (e.g., read-table): a data structure accessed only by reader threads where the thread-specific data structure pointer is stored. This structure may take the form of a table, and is created internally when routines such as pthread_key_create are called. Application specific programming interfaces, such as pthread_getspecific and pthread_setspecific routines, permit retrieving and entering thread-specific data in this table.

Write Data Structure (e.g., write-table): a data structure that may also take the form of a table, and can be accessed by write mode threads, new reader threads, and when a reader thread is destroyed. All write-table access is serialized by using a writer mutex.

In addition, two Boolean variables, such as writer_waiting and writer_running, may be used to manage data access by writer threads. The writer_waiting variable can be set to TRUE by write mode threads after acquiring a writer mutex. Read mode threads yield if the writer_waiting variable is set to TRUE. The writer_running variable is set to TRUE when a writer thread has acquired a read-write lock, it is reset to FALSE when a writer thread releases a read-write lock. This is useful because conventional operating systems often provide a parameter to specify whether a read thread or writer thread has acquired a read-write lock, but there is generally no indication available to determine whether a reader thread or writer thread has released the lock.

Various embodiments of the invention can be implemented in existing network architectures, directory services, security systems, storage interfaces, operating systems, file systems, backup systems, replication systems, and/or communication devices. For example, in some embodiments, the techniques presented herein are implemented in whole or in part using Novell® network services, proxy server products, email products, operating system products, and/or directory services products distributed by Novell, Inc. of Provo, Utah.

Embodiments of the invention can therefore be implemented in a variety of architectural platforms, operating and server systems, devices, systems, and applications. Any particular architectural layout or implementation presented herein is thus provided for purposes of illustration and comprehension only, and is not intended to limit the various embodiments.

Figure 1:
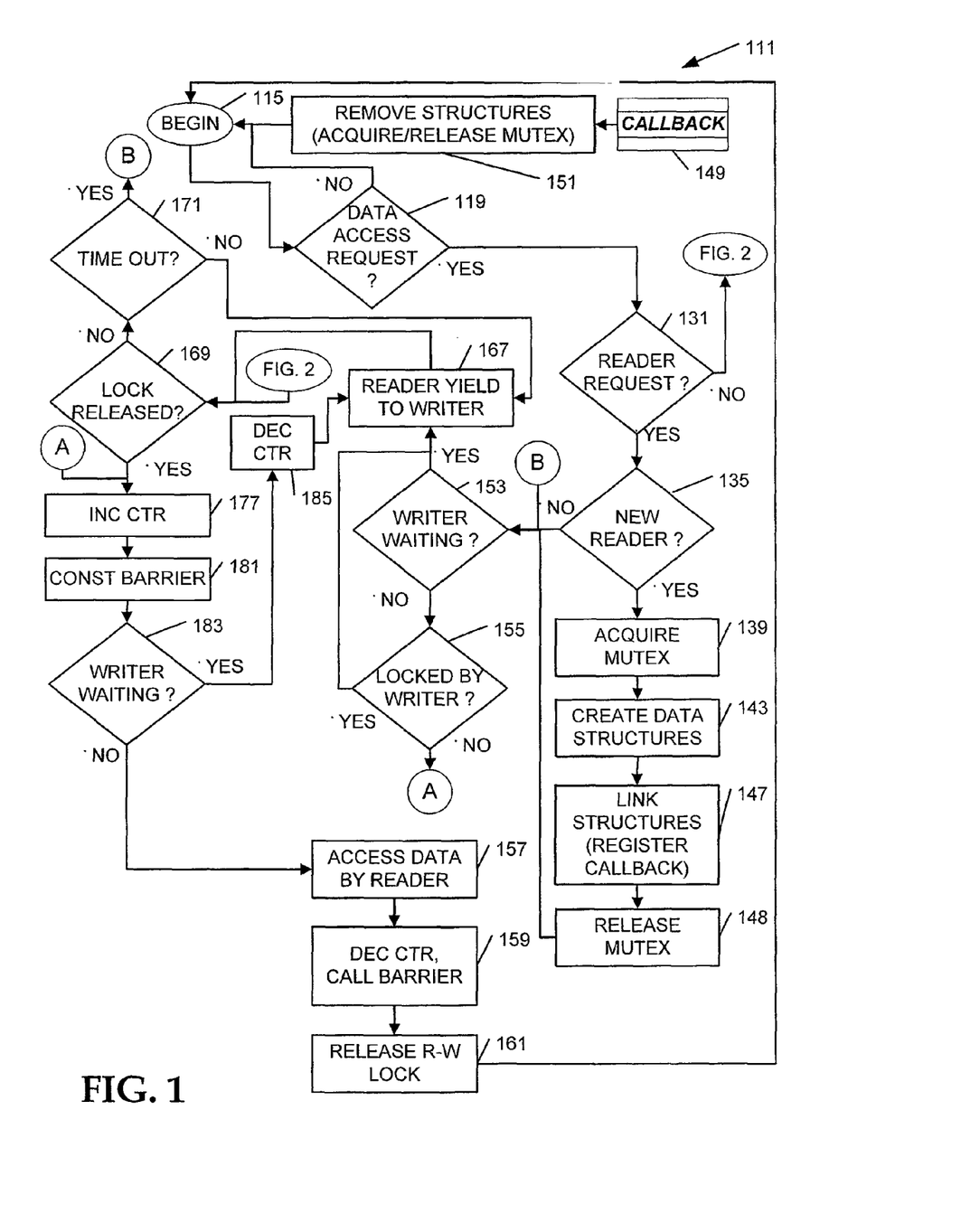
FIG. 1 is a flow diagram illustrating multithreaded lock management methods according various embodiments of the invention.

FIG. 1 is a flow diagram illustrating multithreaded lock management methods 111 according various embodiments of the invention. The methods 111 are implemented in a machine-accessible and readable medium, and may be operational over processes within and among networks. The networks may be wired, wireless, or a combination of wired and wireless. The methods 111 may be implemented as instructions, which when accessed by a machine, perform the processing depicted in FIG. 1. Given this context, multithreaded lock management is now discussed with reference to FIG. 1.

To manage data access operations within a multi-threaded execution environment according to various embodiments, a multi-threaded lock management method 111 may begin at block 115 and continue with determining whether there has been a request to access data at block 119. If not, the method 111 continues to wait for a request by going back to block 115. If so, the method 111 may continue on to block 131 to determine whether a reader thread has made a request to access the data. If not, then the method 111 may continue with any one of the activities shown in FIG. 2.

If a reader thread has made a request to access the data at block 131, then a determination is made as to whether the reader thread is new at block 135. If the reader thread is new, then the method 111 may continue with acquiring a writer mutex at block 139.

The method may then continue on to block 143, with the creation of a read data structure (if not already created), a write data structure (if not already created), and a thread-specific data structure associated with the reader thread requesting access to the data. One of more of the read data structure and the write data structure can form a portion of one or more tables.

Thus, if a reader thread is new and a writer thread is not waiting to access data to be read by the reader thread, the method 111 may include creating the thread-specific use counter associated with a read data structure and a write data structure, and incrementing the thread-specific use counter (see blocks 177, 185).

The method 111 may continue with linking these three structures together at block 147. For example, the method 111 may include linking the thread-specific data structure to the read data structure and the write data structure using a hash mechanism. Thus, in some embodiments, the thread-specific use counter forms a portion of the thread-specific data structure that includes a list linked to the write data structure hash table based on a thread identifier.

The activity at block 147 may also include the registration of a thread destruction call-back function, such as when a new reader thread is determined to exist at block 135. At this time, the method 111 may include, at block 148, releasing the mutex acquired at block 139.

After registration, the call-back function can be called asynchronously when the registering thread is destroyed. Thus, if the call-back function is called at block 149, the method 111 may continue on to block 151 with accessing the data structures created and linked at blocks 143, 147, and removing the structures. The call-back function may be called after a specified time or upon destruction of a selected reader thread to remove a link to the reader thread's thread-specific data structure, for example. This use of call-back functions serves as a protective measure if a reader thread dies without releasing its read-write lock, for example. A mutex may be acquired as part of the activity in block 151, prior to removing the structures. The mutex may also be released as part of the activity in block 151, after the structures are removed.

The method 111 may then continue on to block 153 to determine whether a writer thread is waiting to access the data. If it is determined that a writer thread is not waiting to access the data at block 153, then the method 111 may continue on to block 155 wither determining whether the data has been locked by a writer thread. If it is determined that the data has been locked by a writer thread, then the method 111 may continue on to block 167, with yielding to the writer thread.

The method may then continue on to block 169 to determine whether the lock has been released at block 169. If the lock has not been released, then the method 111 may continue on to block 171 to determine whether a lock timer has timed out (since the reader thread waiting on the writer thread lock may be associated with a time out timer of about 20 milliseconds). This lock timer time out value is variable, and can be set for more or less time. If the timer is found to have timed out at block 171, then the method may continue on to block 153. If the timer has not yet timed out at block 171, then the method 111 may continue with yielding to the writer thread and waiting for the lock to be released at block 167.

If it is determined that the data to be accessed has not been locked by a writer thread at block 155, or that a writer thread lock has been released at block 169, then the method 111 may continue on with incrementing a thread-specific use counter (e.g., forming part of the thread-specific data structure) at block 177. The method 111 may then go on to block 181 to continue with constructing a serializing instruction execution memory barrier to protect a thread-specific user counter by serializing parallel instruction execution by one or more processors. In some embodiments, then, the processor executing the reader thread may be a member of a group of processors, and the memory barrier can be applied across the group of processors.

If it is determined that a writer thread is waiting to access the data after the thread-specific use counter is created and incremented at block 183, then the method 111 may include decrementing the thread-specific use counter without accessing the data by the reader thread at block 185. The method 111 may then continue on to block 167, with yielding to the writer thread.

If no writer thread is determined to be waiting to access the data at block 183, then the method 111 may continue with accessing the data by the reader thread at block 157 and then decrementing the thread-specific use counter at block 159. The method 111 may also include calling the barrier into action at block 159, and then continue on to releasing the read mode read-write lock associated with the data after decrementing the thread-specific use counter at block 161, and then returning to the beginning at block 115. At any point, the method 111 may include using a cache coherent protocol to notify one or more processors (other than the processor actively accessing the data) as to the status of the thread-specific use counter.

The thread-specific data structures, and included thread-specific use counters, may be accessed for reading by a variety of entities. For example, the thread-specific use counter may be accessed via the read data structure using a plurality of active reader threads associated with individual thread-specific data structures linked to the read data structure. The read data structures for all reader threads may also be accessed by a writer thread to determine whether any active reader threads exist.

Figure 2:
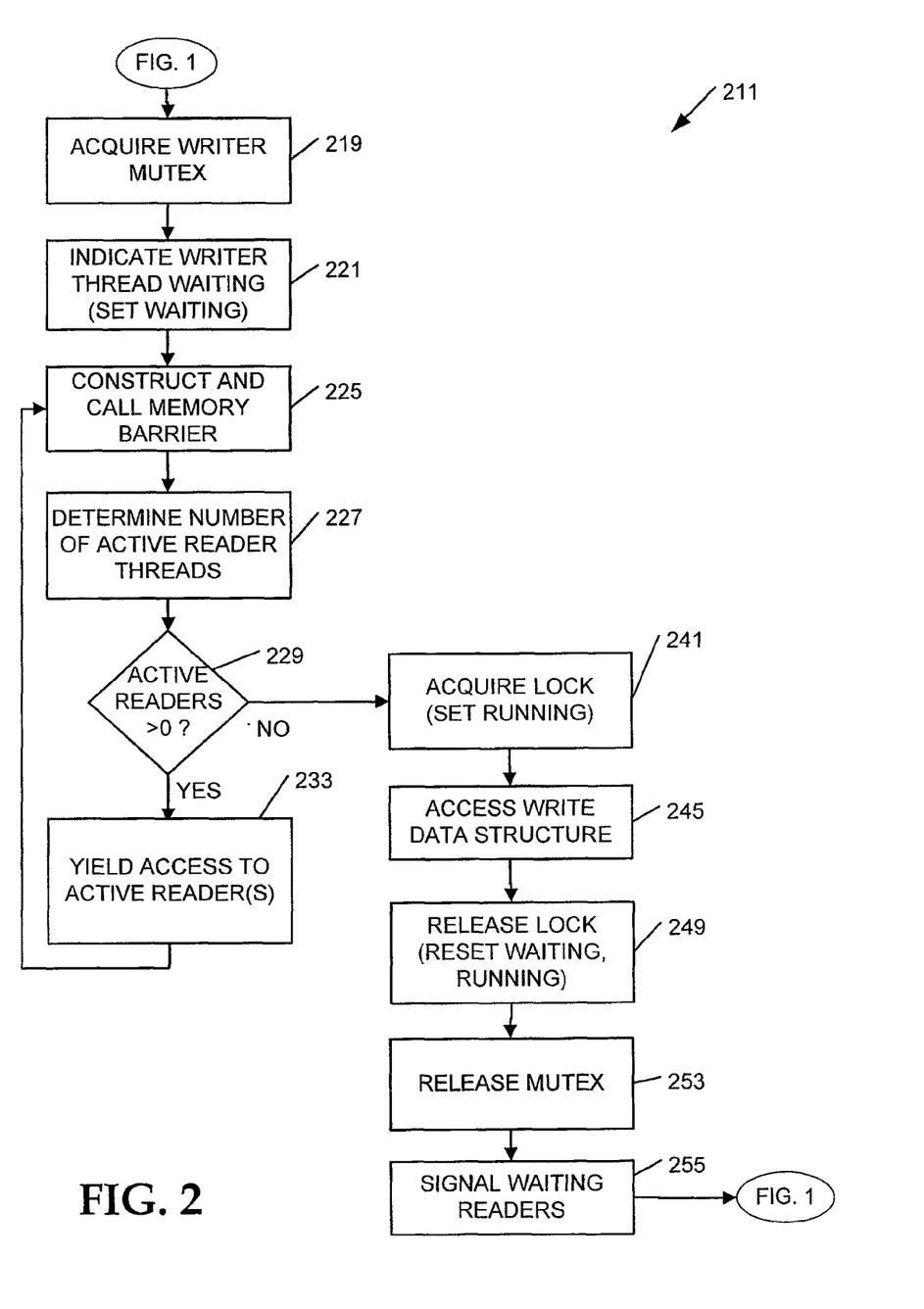
FIG. 2 is another flow diagram illustrating multithreaded lock management methods according various embodiments of the invention.

FIG. 2 is another flow diagram illustrating multithreaded lock management methods 211 according various embodiments of the invention. In this case, multithreaded lock management is described more specifically with respect to writer thread operations, as opposed to the focus on reader thread operations in FIG. 1. The methods 211 are implemented in a machine-accessible and readable medium, and may be operational over processes within and among networks. The networks may be wired, wireless, or a combination of wired and wireless. The methods 211 may be implemented as instructions, which when accessed by a machine, perform the processing depicted in FIG. 2.

In some embodiments, a method 211 may begin upon entry from the method 111 of FIG. 1 (see block 131 of FIG. 1) at block 217, or independently at block 219, with acquiring a writer mutex to manage serial access to the write data structure. Acquiring the writer mutex may include setting a write mode read-write lock associated with the data.

The method 211 may continue on with indicating a writer thread is waiting to access data at block 221. This may occur using an atomic exchange operation (i.e., an indivisible transaction) that locks the system bus before changing or setting the indicator writer_waiting status variable to a logical value of TRUE or "1".

The thread-specific data structure should be protected by a serializing instruction execution memory barrier, linked to a write data structure and a read data structure, as described previously. Thus, the method 211 may include creating and calling a memory barrier at block 225. If memory barriers are not introduced to protect variables, look-ahead or cached values for the thread-specific use counter may be used by the processor executing various threads, and such values may be incorrect. The method 211 may then go on to include determining the number of active reader threads by accessing thread-specific data forming a portion of a thread-specific data structure at block 227. This activity may include a writer thread using the return value of an atomic increment having a value of zero (locking the system bus) to determine the number of active reader threads.

If it is determined that the number of active reader threads is not greater than zero at block 229, the method 221 may continue on to block 241, with acquiring a write-mode, read-write lock on the data to be accessed. Before the lock is acquired, the writer_running status variable or flag may be set to a logical value of TRUE or "1" (e.g., using an atomic exchange). If it is determined that the number of active threads is greater than zero at block 229, the method 221 may include yielding access to the data to the active reader threads at block 233, and then go on to block 225.

The method 211 may continue on to block 245, with accessing the write data structure, perhaps after creating one or more thread-specific data structures. The write data structure may be accessed by the writer thread, by new reader threads, and by call-back functions upon destruction of one of the active reader threads. Thus, the method 211 may include accessing the write data structure via a write mode using a writer mutex.

The method 211 may include releasing a read-write lock by the writer thread, or by one of the active reader threads, at block 249. An atomic exchange operation may be used to reset the logical value of the writer_waiting and writer_running status variables to FALSE or "0". Of course, other logical values can be used, as will be well-understood by those of ordinary skill in the art. The method 211 may go on to release the writer mutex at block 253, and then to signal any waiting readers at block 255. The method 211 may then continue on to block 169 of FIG. 1.

Referring now to FIGS. 1 and 2, in most embodiments, mutexes are generally acquired for the write mode read-write lock, and not for the read mode. Sometimes a mutex is acquired for a read mode read-write lock as well, but this should occur only when new thread-specific data is created.

If a writer thread is waiting to access data, reader threads attempting to access the same data should yield access to the data. If there is not a writer thread waiting, and a new reader thread is waiting, then its thread-specific data structure will be inserted into the read data structure (e.g., read-table) and the write data structure (e.g., write-table). A thread-specific use counter may form part of the thread-specific data structure.

Once the thread-specific use counter is created, it can be incremented. For a new reader thread, it will be incremented if no writer threads are waiting. For an old reader thread, the thread-specific counter will already have been created, so it is simply incremented prior to accessing the data. Then, if a writer thread is waiting, the counter is decremented and access to the data will be yielded to the writer thread. The counter may also be decremented if no writer is waiting, after the reader thread has accessed the data.

Thus, many reader threads may have access to the same data at the same time, without creating internal mutexes. For example, there may be five different reader threads with five different data structures, and they all might access the same data. They all might have an incremented use count, such that one reader won't block on another one that has its own use count. If a writer thread determines that any reader thread is active (as indicated by an incremented thread-specific use counter), the writer thread will wait to access the data until after the active reader threads are done accessing the data, and they release their read mode read-write locks, or until they yield access.

The Boolean variable writer_waiting can be set by the writer to indicate to reader threads that a writer thread is waiting to access the data. Then reader threads attempting to access the data can check to see if this variable is set, and if so, yield access to the writer thread (by setting their thread-specific use counters to zero).

If a read mode read-write lock has been set, the reader thread will check to see if a writer thread is waiting. If not, the thread-specific use counter will be incremented, and the reader thread will check once again to determine whether any writer threads are waiting. If a writer thread is waiting, the reader thread's thread-specific use counter will be decremented and access will be given to the writer thread by the reader thread. In all embodiments, thread-specific use counters may also be implemented by Boolean variables or flags, perhaps having an ACTIVE state, and an INACTIVE state (corresponding to a counter that has been incremented or decremented/newly-created, respectively).

The read data structure exists so that all the reader threads can access it, and the write data structure exists so all of the writer threads can access it. The read and write data structures share a common link to each thread-specific data structure. In addition to links, the data structures may also be used to store thread identifiers, perhaps using a hashing mechanism to associated identifiers with a limited number of buckets, or storage locations. Thus, the number of active threads may be much larger than the number of buckets. The structures can then be more easily maintained as threads are created and destroyed.

In most cases, the memory barrier can be created after a thread-specific use counter is incremented. This results in serializing execution by one or more processors, and flushing the use counter to notify other processors or threads of the counter status, perhaps using a cache coherence protocol.

Figure 3:
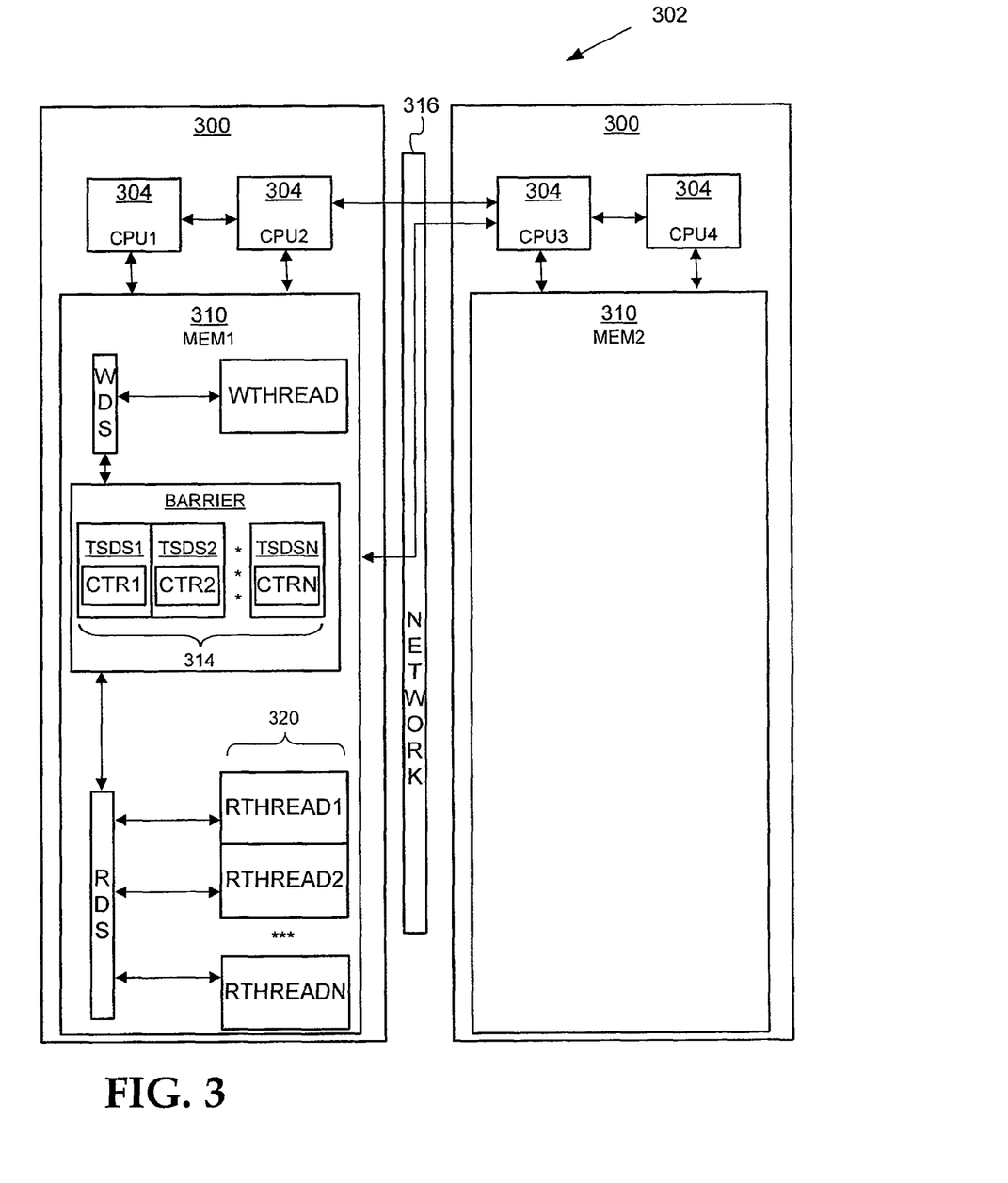
FIG. 3 is a block diagram of multithreaded lock management apparatus and systems according various embodiments of the invention.

FIG. 3 is a block diagram of multithreaded lock management apparatus 300 and systems 302 according various embodiments of the invention. The multithreaded lock management apparatus 300 and system 302 are implemented in a machine-accessible and readable medium and are operational over one or more networks (e.g., the network 316). Such networks 316 may be wired, wireless, or a combination of wired and wireless. The multithreaded lock management apparatus 300 and system 302 implement, among other things, the processing associated with the multithreaded lock management methods 111 and 211 of FIGS. 1 and 2, respectively.

Turning now to FIG. 3, it can be seen that in some embodiments the multithreaded lock management apparatus 300 comprises a memory 310 to store one or more thread-specific use counters 314 associated with one or more corresponding active reader threads 320. The apparatus 300 may include one or more processors 304 (e.g., CPU1, CPU2 or CPU3, CPU4) to modify the thread-specific use counters 314. Each of the thread-specific use counters CTR1, CTR2, ..., CTRN may be modified solely via its corresponding active reader thread (e.g., RTHREAD1, RTHREAD2, ..., RTHREADN) or a thread destruction recovery process.

In most embodiments, thread-specific use counters (e.g., CTR1) form a portion of thread-specific data structures (e.g., TSDS1) protected by a serializing instruction execution memory barrier BARRIER. The thread-specific data structures TSDS1, TSDS2, ..., TSDSN are linked to a write data structure WDS and a read data structure RDS associated with a writer thread WTHREAD and one or more active reader threads 320, respectively. In this way, the processors CPU1, CPU2 can have read access to thread-specific use counters 314 via a plurality of reader threads 320. The processors CPU1, CPU2 may also have read access to the thread-specific use counters 314 via writer threads, such as the writer thread WTHREAD.

In some embodiments, the apparatus 300 may include the processors CPU1, CPU2 and the memory 310 forming part of a single server, so that each apparatus 300 may comprise a single server. The apparatus 300 may be configured with the memory 310 to store data (e.g., whatever is stored in or linked to the read data structure RDS) to be accessed by a plurality of reader threads 320 as long as a thread-specific use counter 314 indicates one or more reader threads are still active.

Other embodiments may be realized. For example, it can be seen that a multithreaded lock management system 302 may comprise a memory 310 to store one or more thread-specific use counters 314 associated with one or more active reader threads. The system 302 may also comprise a plurality of processors 304 to implement a cache coherence protocol, including at least one processor to modify thread-specific use counters 314 solely via the corresponding active reader threads 320 or a thread destruction recovery process. The thread-specific use counters 314 may form portions of thread-specific data structures TSDS1, TSDS2, ..., TSDSN protected by a serializing instruction execution memory barrier BARRIER. The thread-specific data structures TSDS1, TSDS2, ..., TSDSN are also linked to a write data structure WDS and a read data structure RDS associated with writer threads (e.g., writer thread WTHREAD) and active reader threads 320, respectively.

For example, Intel® processor cache coherence protocols can be used so that read and write operations are visible to all processors 304 when appropriate memory barriers BARRIER are used. Such protocols include, but are not limited to an MSI (modified, shared, invalid) protocol, a MESI (modified, exclusive, shared, invalid) protocol, a MOSI (modified, owned, shared, invalid) protocol, and a MOESI (modified, owned, exclusive, shared, invalid) protocol.

In some embodiments, each one of the plurality of processors 304 has read access to the write data structure WDS and the read data structure RDS. The memory 310 and the plurality of processors 304 may form a portion of a symmetric multiprocessing architecture.

Implementing the apparatus, systems, and methods described herein may thus improve processing performance when read-write locks are frequently used in the read mode, since internal write mutexes are not acquired in the same way as in prior systems. The improvements gained may be even greater when the disclosed mechanisms are used within symmetric multiprocessing environments.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus, comprising:
  a memory to store a thread-specific use counter associated with an active reader thread; and
  a processor to modify the thread-specific use counter solely via the active reader thread or a thread destruction recovery process, wherein the thread-specific use counter forms a portion of a thread-specific data structure protected by a serializing instruction execution memory barrier, and wherein the thread-specific data structure is linked to a write data structure and a read data structure associated with a writer thread and the active reader thread, respectively, and wherein the active reader thread is configured to release a read mode read-write lock associated with data being accessed after decrementing the thread-specific use counter.

2. The apparatus of claim 1, wherein the processor is to have read access to the thread-specific use counter via a plurality of reader threads, including the active reader thread.

3. The apparatus of claim 1, wherein the processor is to have read access to the thread-specific use counter via the writer thread.

4. The apparatus of claim 1, further comprising:
  a memory to store data to be accessed by a plurality of reader threads, including the active reader thread, as long as the thread-specific use counter indicates the active reader thread is still active.

5. The apparatus of claim 1, wherein the thread-specific use counter associated with the active reader thread is greater than zero.

6. A system, comprising:
  a memory to store a thread-specific use counter associated with an active reader thread; and
  a plurality of processors to implement a cache coherence protocol, including at least one processor to modify the thread-specific use counter solely via the active reader thread or a thread destruction recovery process, wherein the thread-specific use counter forms a portion of a thread-specific data structure protected by a serializing instruction execution memory barrier, and wherein the thread-specific data structure is linked to a write data structure and a read data structure associated with a writer thread and the active reader thread, respectively, and wherein the active reader thread is configured to release a read mode read-write lock associated with data being accessed after decrementing the thread-specific use counter.

7. The system of claim 6, wherein each one of the plurality of processors has read access to the write data structure and the read data structure.

8. A method, comprising:
  constructing a serializing instruction execution memory barrier to protect a thread-specific use counter by serializing parallel instruction execution by at least one processor;
  if a reader thread is new and a writer thread is not waiting to access data to be read by the reader thread, creating the thread-specific use counter associated with a read data structure and a write data structure, and incrementing the thread-specific use counter;
  if the writer thread is waiting to access the data after the thread-specific use counter is created, then decrementing the thread-specific use counter without accessing the data by the reader thread; and
  otherwise, accessing the data by the reader thread and then releasing, by the reader thread, a read mode read-write lock associated with the data after decrementing the thread-specific use counter.

9. The method of claim 8, wherein at least one of the read data structure and the write data structure form a portion of a table.

10. The method of claim 8, wherein the thread-specific use counter forms a portion of a thread-specific data structure including a list linked to a writer hash table based on a thread identifier.

11. The method of claim 8, comprising:
  yielding access to the data, by the reader thread, to the writer thread that is waiting, prior to creation of the thread-specific use counter.

12. The method of claim 11, comprising:
  repeating the yielding until the writer thread has unlocked access to the data and is no longer waiting.

13. The method of claim 8, comprising:
  using a cache coherent protocol to notify processors other than the at least one processor as to the status of the thread-specific use counter.

14. The method of claim 8, wherein the at least one processor is a member of a group of processors, and wherein the memory barrier is applied across the group of processors.

15. The method of claim 8, comprising:
  after incrementing the thread-specific use counter, setting a read mode read-write lock associated with the data.

16. The method of claim 8, comprising:
  accessing the thread-specific use counter via the read data structure using a plurality of active reader threads associated with individual thread-specific data structures linked to the read data structure.

17. The method of claim 8, comprising:
  accessing the read data structure by the writer thread to determine whether any active threads exist.

18. The method of claim 8, comprising:
  linking the thread-specific data structure to the read data structure and the write data structure using a hash mechanism.

19. The method of claim 8, comprising:
  accessing the read data structure by a call-back function after a specified time or upon destruction of the reader thread to remove a link to the thread-specific data structure.

20. A method, comprising:
  indicating a writer thread is waiting to access data;
  determining a number of active reader threads by accessing thread-specific data forming a portion of a thread-specific data structure protected by a serializing instruction execution memory barrier, wherein the thread-specific data structure is linked to a write data structure and a read data structure; and if the number of active reader threads is not greater than zero, indicating that the writer thread is no longer waiting to access the data and acquiring a writer mutex to manage serial access to the write data structure, wherein at least one of the number of active reader threads is configured to release a read mode read-write lock associated with the data after decrementing the thread-specific data.

21. The method of claim 20, comprising:

if the number of active threads is greater than zero, yielding access to the data to the active reader threads until the number of active threads release their read mode read-write locks associated with the data.

22. The method of claim 20, wherein acquiring the writer mutex includes setting a write mode read-write lock associated with the data.

23. The method of claim 20, comprising:

accessing the write data structure after creating the thread-specific data structure, by the writer thread, by new reader threads, and by a call-back function upon destruction of one of the active reader threads.

24. The method of claim 20, comprising:

accessing the write data structure via a write mode using a writer mutex.

25. The method of claim 20, comprising:

releasing a read-write lock by one of the active reader threads or the writer thread; and checking status of a writer-running variable to determine whether the one of the active reader threads or the writer thread has released the read-write lock.

* * * * *